United States Patent
Coscia et al.

(10) Patent No.: US 10,744,472 B2
(45) Date of Patent: Aug. 18, 2020

(54) SYSTEM OF PRODUCT GAS COLLECTION CONDUITS FOR A STEAM REFORMER

(71) Applicant: L'Air Liquide, Societe Anonyme pour l'Etude et l'Exploitation des Procedes Georges Claude, Paris (FR)

(72) Inventors: Antonio Coscia, Hadamar (DE); Tobias Kaiser, Reichelsheim (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 50 days.

(21) Appl. No.: 16/061,852

(22) PCT Filed: Dec. 5, 2016

(86) PCT No.: PCT/EP2016/025166
§ 371 (c)(1),
(2) Date: Jun. 13, 2018

(87) PCT Pub. No.: WO2017/102093
PCT Pub. Date: Jun. 22, 2017

(65) Prior Publication Data
US 2018/0361337 A1 Dec. 20, 2018

(30) Foreign Application Priority Data
Dec. 15, 2015 (EP) .................................. 15003601

(51) Int. Cl.
*B01J 4/00* (2006.01)
(52) U.S. Cl.
CPC .......... *B01J 4/001* (2013.01); *B01J 2204/005* (2013.01); *B01J 2204/007* (2013.01);
(Continued)

(58) Field of Classification Search
CPC combination set(s) only.
See application file for complete search history.

(56) References Cited

U.S. PATENT DOCUMENTS 4,477,332 A * 10/1984 Stickler .................... C10G 1/02
201/2.5
4,529,381 A * 7/1985 Michelson ............ F27D 1/0033
196/100

(Continued)

FOREIGN PATENT DOCUMENTS

| DE | 102006022898 | 9/2007 |
|---|---|---|
| EP | 0 799 639 | 10/1997 |
| WO | WO 2013/147598 | 10/2013 |

OTHER PUBLICATIONS

International Search Report and Written Opinion for PCT/EP016/025166, dated Feb. 23, 2017.

*Primary Examiner* — Kaity V Chandler
(74) *Attorney, Agent, or Firm* — Justin K. Murray

(57) ABSTRACT

A system of product gas collecting conduits for a steam reformer, containing a plurality of reaction tubes within a reformer housing, for the production of synthesis gas, comprising: a) a product gas collecting conduit arranged outside the reformer housing of the steam reformer, b) several port tubes arranged along the length of the conduit for connecting one reaction tube each to the product gas collecting conduit, c) at least one windshield for the protection of the product gas collecting conduit against wind and draft.

18 Claims, 3 Drawing Sheets

(52) U.S. Cl.
CPC ......... *B01J 2208/00486* (2013.01); *B01J 2208/00495* (2013.01); *B01J 2208/00973* (2013.01); *B01J 2219/00153* (2013.01); *B01J 2219/00155* (2013.01)

(56) References Cited

U.S. PATENT DOCUMENTS

| | | | |
|---|---|---|---|
| 5,935,531 A | | 8/1999 | Giacobbe |
| 6,228,146 B1* | | 5/2001 | Kuespert ............... B01D 61/00 166/105.5 |
| 6,255,357 B1* | | 7/2001 | Abbott .................. C01B 3/382 518/700 |
| 2004/0037760 A1 | | 2/2004 | Fell |
| 2008/0038165 A1* | | 2/2008 | Burlingame ............. F28D 7/16 422/608 |

* cited by examiner

SYSTEM OF PRODUCT GAS COLLECTION CONDUITS FOR A STEAM REFORMER

CROSS REFERENCE TO RELATED APPLICATIONS

This application is a § 371 of International PCT Application PCT/EP2016/025166, filed Dec. 5, 2016, which claims the benefit of EP15003601.0, filed Dec. 15, 2015, both of which are herein incorporated by reference in their entireties.

FIELD OF THE INVENTION

This invention relates to a system of product gas collecting conduits for a steam reformer, containing a plurality of reaction tubes within a reformer housing, for the production of synthesis gas. This invention furthermore comprises a steam reformer which is equipped with the system of product gas collecting conduits according to the invention.

BACKGROUND OF THE INVENTION

Steam reformers and their systems of product gas collecting conduits are known and their fundamentals are described e.g. in Ullmann's Encyclopedia of Industrial Chemistry, 6th Ed., Vol. 15, p. 332, chapter 2.2.3.

The product gas collecting conduits have the task of taking up up the hot synthesis gas coming from the reaction tubes with a temperature of 900° C. and a high pressure of e.g. 30 bar, and of discharging the same for the further treatment, in particular for cooling by as far as possible recovering the heat contained in the gas. Since the collecting conduits are laid outdoors, they are constructed of a jacket tube and a concentric inner tube with interposed insulation, so as not to dissipate an unnecessary amount of heat to the ambient air. In operation of the reformer, the temperature of the jacket tube on the one hand should be high enough to safely exclude the formation of corrosive condensates in the insulating layer and in particular on the inner wall of the jacket tube, and on the other hand the temperature should not be so high that the steel of the jacket tube is weakened. This is why the insulation disposed between inner tube and jacket tube is designed such that in operation the jacket temperature approximately lies in the range of 150 to 200° C. and an outer insulation of the collecting conduits is omitted completely.

A particular problem consists in setting a temperature as uniform as possible on the entire circumference of the jacket tube, in order to avoid different thermal expansions in the jacket and hence a distortion of the collecting conduit along its length. However, this objective is difficult to achieve, as the upper side of the collecting conduits is exposed to the radiation heat emitted by the reformer bottom and in addition receives an inflow of heat via the ports of the collecting conduit connected with the hot reformer tubes.

The drawing of the European Patent EP 0 799 639 A1 shows a frequently used embodiment of such port. With a view to this drawing the skilled person can understand how heat is transmitted from the hot, gas-carrying inner port tube to the jacket tube of the port and on to the jacket tube of the collecting conduit.

In contrast thereto the bottom sides of the collecting conduits merely are exposed to wind and draft. In general, this leads to the fact that the temperature of the upper side is higher than that of the bottom side, which leads to a stronger thermal expansion of the upper side and hence to bending of the collecting conduit.

A conceivable countermeasure might consist in designing the internal insulation of the collecting conduit with heat transfer coefficients varying over the circumference, as it is proposed in the German patent specification DE 10 2006 022 898 B3. In this way, the amount of heat transmitted from the hot gas flowing in the inner tube through the internal insulation to the jacket tube can be set to vary over the tube circumference such that the above-described external influences are compensated. However, the technical realization of such insulation is expensive.

Therefore, it is the object of the invention to provide a less expensive design of a system of product gas collecting conduits, in which the disadvantages of the prior art at least occur to a reduced extent.

SUMMARY OF THE INVENTION

This object is solved by a system of product gas collecting conduits and by a steam reformer equipped therewith according to the embodiments described herewith.

System of Product Gas Collecting Conduits According to an Embodiment of the Invention A system of product gas collecting conduits for a steam reformer, containing a plurality of reaction tubes within a reformer housing, for the production of synthesis gas, comprising:

a) a product gas collecting conduit arranged outside the reformer housing of the steam reformer and exposed to the ambient air, containing a jacket tube and an inner tube extending concentrically along the entire length, wherein the space between inner tube and jacket tube is filled with insulating material, b) several, at least one first and one last, port tubes arranged along the length of the conduit for connecting one reaction tube each to the product gas collecting conduit, c) at least one windshield, wherein the windshield is designed and arranged such that it protects the product gas collecting conduit against wind and draft at least on a part of its length and its circumference.

The at least one windshield can be designed and arranged with respect to the collecting conduit such that e.g. the bottom side of the jacket tube of the collecting conduit largely is protected against wind and draft.

PREFERRED ASPECTS OF THE INVENTION

A preferred embodiment of the invention is characterized in that each port tube comprises a jacket tube and an inner tube extending concentrically along its entire length, wherein the space between inner tube and jacket tube is filled with insulating material, and wherein the port tube reaches down into the bottom of the reformer housing. By incorporating an insulating layer between the two concentrically arranged tubes, the heat conduction to the synthesis gas collector and hence the deflection of the collecting conduit is reduced.

Another preferred embodiment of the invention is characterized in that the port tubes on the circumference of the collecting conduit are arranged on a straight, axial line. This embodiment allows a uniformization of the treatment of the synthesis gas produced in the steam reformer in various reformer tubes.

Another preferred embodiment of the invention is characterized in that the inner tubes of the port and/or of the collecting conduit are designed such that they are gas-permeable, so that the respective jacket conduit is exposed to the pressure of the synthesis gas. The gas permeability of the inner tube, which the skilled person also refers to as liner, is a consequence of the expansion joints present in the tube, by which the temperature-related material expansions are compensated.

Another preferred embodiment of the invention is characterized in that the product gas collecting conduit is arranged horizontally. This provides a uniform distance of the conduit to the likewise horizontally mounted reformer. The assembly of the reformer and of the system of product gas collecting conduits thereby is simplified.

Another preferred embodiment of the invention is characterized in that the inner tube of the port tube is fabricated of metal. As compared to a tube of ceramic material, the assembly of the tube thereby is facilitated.

Another preferred embodiment of the invention is characterized in that the port tube is equipped with an external insulation against heat loss. The jacket tube of the port, in contrast to that of the collecting conduit, is fabricated of high-temperature steel. This is why the advantage of an external insulation here can be utilized without the tube losing strength to an inadmissible extent due to the increased temperature.

Another preferred embodiment of the invention is characterized in that the windshield has the shape of a half shell. This shape provides for a uniform distance of the windshield to the tube wall.

Another preferred embodiment of the invention is characterized in that the windshield is arranged between the first and the last port tube. This kind of arrangement covers the region of the collecting conduit in which the ports are located, so that a good effect of the windshield is achieved, in particular when it is arranged centrally between the first and the last port tube.

Another preferred embodiment of the invention is characterized in that the windshield is arranged such that it protects the collecting conduit on the side opposite the port tubes. In this way, the part of the jacket tube most remote from the port tubes and heated least is protected against wind and draft.

Another preferred embodiment of the invention is characterized in that the windshield is of multipart design. The windshield thereby can take account of constructional requirements, such as e.g. supports and holders for the collecting conduits.

The invention also relates to a steam reformer, equipped with at least one system of product gas collecting conduits according to the invention or its preferred embodiments.

BRIEF DESCRIPTION OF THE DRAWINGS

Further features, advantages and possible applications of the invention can also be taken from the following description of exemplary embodiments and the drawings. All features described and/or illustrated form the subject-matter of the invention per se or in any combination, independent of their inclusion in the claims or their back-reference.

The invention will now be explained below with reference to the drawing, in which.

DETAILED DESCRIPTION OF THE INVENTION

Figure 1:
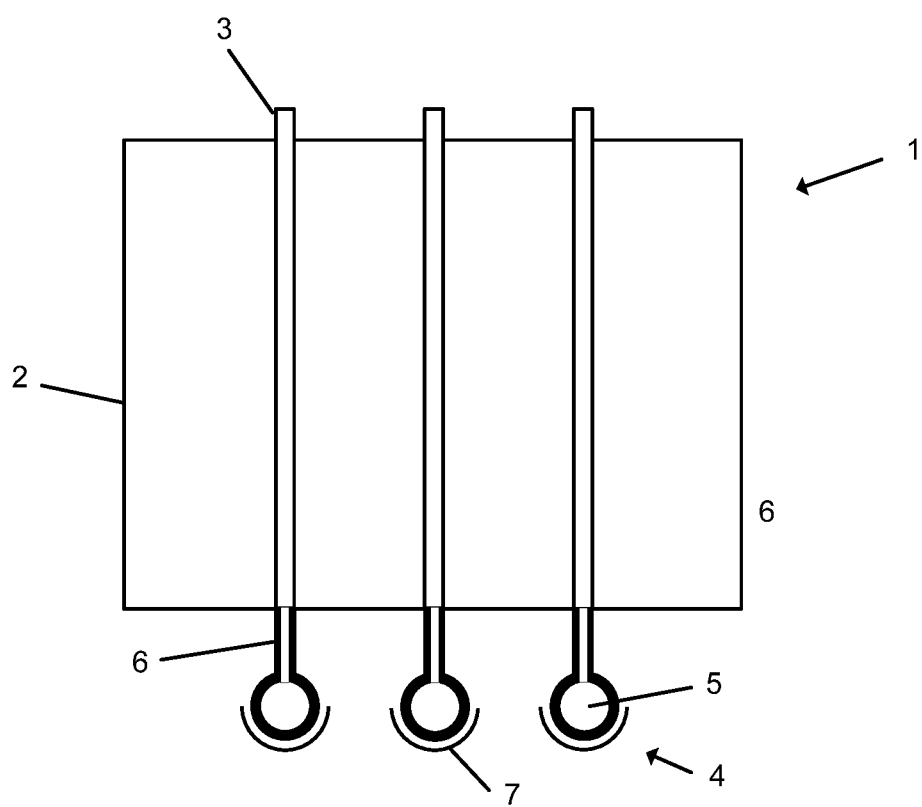
FIG. 1: Shows a sectional drawing through a steam reformer transversely to its longitudinal axis, equipped with three systems of product gas collecting conduits according to the invention.
Figure 2:
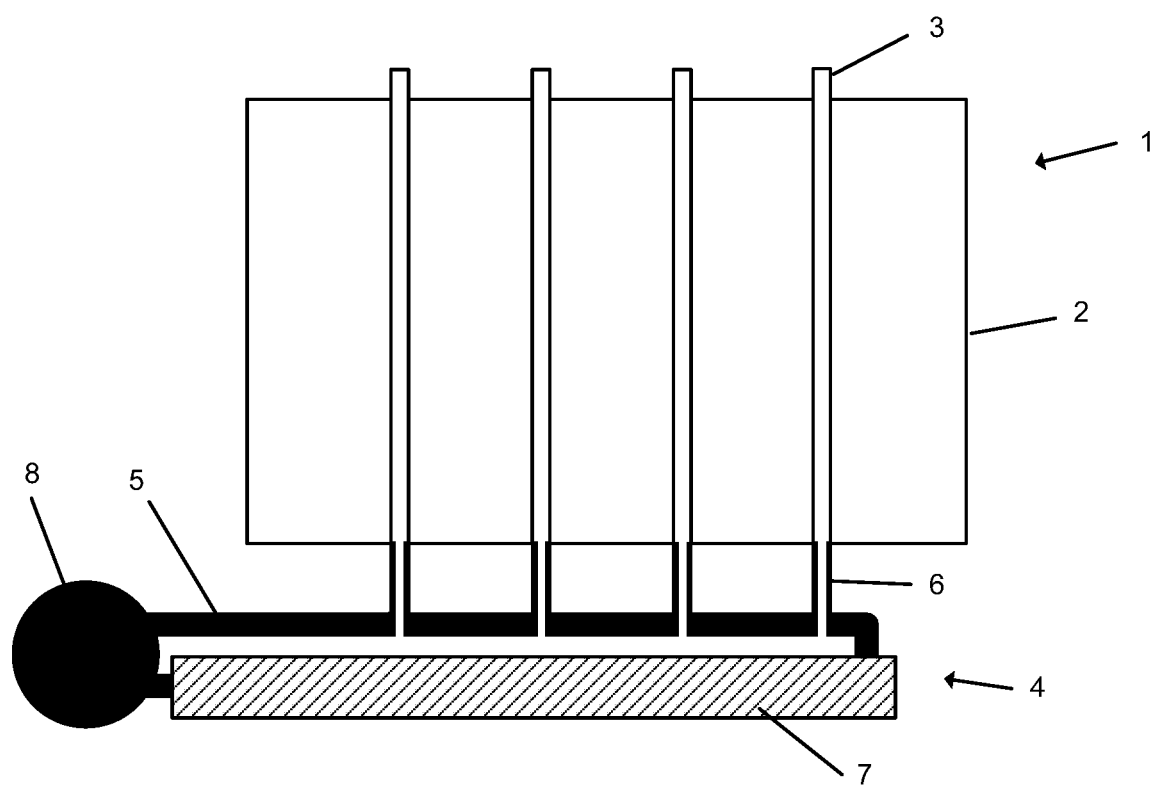
FIG. 2: Shows a longitudinal section through a steam reformer and through a system of product gas collecting conduits of the reformer according to the invention.
Figure 3:
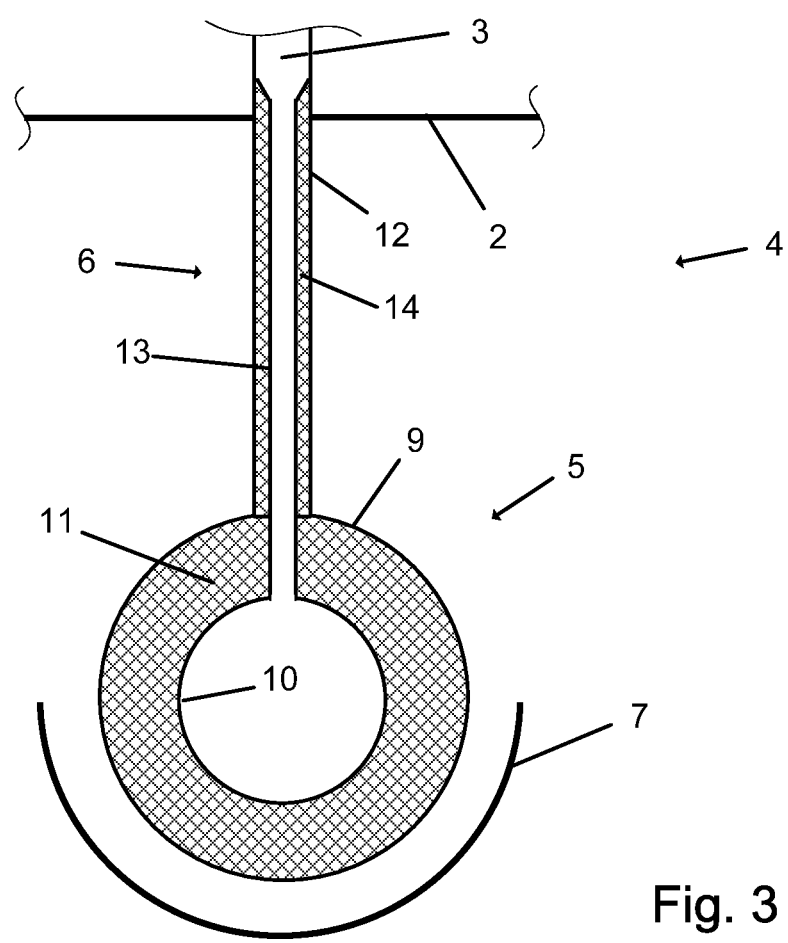
FIG. 3: Shows a cross-section through a system of product gas collecting conduits according to the invention.

In detail, the following is shown in the Figures of the drawing:

FIG. 1:

This cross-section of a steam reformer 1 goes through the reformer housing 2 and three reformer tubes 3 installed therein. The burners arranged between the reformer tubes in the ceiling of the reformer housing as well as all pipe conduit systems present for supplying and discharging the process and waste gases, as far as they do not concern the invention, are not shown in the drawing. Furthermore, the Figure shows three systems 4 of product gas collecting conduits according to the invention, comprising one product gas collecting conduit 5 each with its port tubes 6 and its windshield 7.

FIG. 2:

This longitudinal section of a steam reformer 1 goes through the reformer housing 2 and one of the reformer tube rows installed therein, which consists of the four reformer tubes 3. Furthermore, the Figure shows the system 4 of product gas collecting conduits associated to the reformer tube row with the product gas collecting conduit 5 shown in longitudinal section, its port tubes 6 and the windshield 7 covering the bottom half of the product gas collecting conduit 5. The product gas collecting conduit opens into a further, transversely extending collecting conduit 8 which, however, does not belong to the invention.

FIG. 3:

This Figure shows a cross-section through a system 4 of product gas collecting conduits according to the invention, comprising the product gas collecting conduit 5, its jacket tube 9, its inner tube 10, the insulating material 11 disposed between inner tube and jacket tube, a port tube 6 which reaches down into the bottom of the reformer housing 2 and is connected there to a reactor tube 3. There is furthermore shown the jacket tube 12, the inner tube 13 and the insulating material 14 disposed between inner tube and jacket tube as well as the windshield 7. The holder of the windshield is not shown. It can be attached for example to the jacket of the product gas collecting conduit or also to the reformer housing. The design and attachment of the windshield can be adapted to the local circumstances with respect to spatial conditions and wind direction. In this Figure, the windshield is formed with a semicircular cross-section and it is placed such that it exactly covers the bottom side of the collecting conduit. It is, however, also possible to place it such that it preferably protects one of the side faces of the collecting conduit.

INDUSTRIAL APPLICABILITY

The invention provides an economic and technically uncomplicated solution to achieve a more uniform jacket temperature of a product gas collecting conduit and reduce tensions in the jacket tube which are caused by a temperature difference. The invention therefore is industrially applicable.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS 1 steam reformer
2 reformer housing
3 reformer tubes
4 system of product gas collecting conduits
5 product gas collecting conduit
6 port tube
7 windshield
8 collecting conduit
9 jacket tube
10 inner tube
11 insulating material
12 jacket tube
13 inner tube
14 insulating material

The invention claimed is:

1. A system of product gas collecting conduits for a steam reformer, containing a plurality of reaction tubes within a reformer housing, for the production of synthesis gas, the system comprising:
   a) a product gas collecting conduit arranged outside the reformer housing of the steam reformer and exposed to the ambient air, containing a jacket tube and an inner tube extending concentrically along an entire length of the product gas collecting conduit, wherein the space between inner tube and jacket tube is filled with insulating material;
   b) several, at least one first and one last, port tubes arranged along the length of the product gas collecting conduit for connecting one reaction tube each to the product gas collecting conduit; and
   c) a windshield, wherein the windshield is designed and arranged such that the windshield protects the product gas collecting conduit against wind and draft at least on a part of the length and the circumference of the product gas collecting conduit.

2. The system of product gas collecting conduits according to claim 1, wherein each port tube comprises a jacket tube and an inner tube extending concentrically along the entire length of each port tube, wherein the space between inner tube and jacket tube is filled with insulating material, and wherein the port tube reaches down into the bottom of the reformer housing.

3. The system of product gas collecting conduits according to claim 1, wherein the inner tubes of the port and/or of the collecting conduit are designed such that they are gas-permeable, so that the respective jacket conduit is exposed to the pressure of the synthesis gas.

4. The system of product gas collecting conduits according to claim 1, wherein the port tubes on the circumference of the product gas collecting conduit are arranged on a straight, axial line.

5. The system of product gas collecting conduits according to claim 1, wherein the product gas collecting conduit is arranged horizontally.

6. The system of product gas collecting conduits according to claim 1, wherein the inner tube of the port tube is fabricated of metal.

7. The system of product gas collecting conduits according to claim 1, wherein the port tube is equipped with an external insulation against heat loss.

8. The system of product gas collecting conduits according to claim 1, wherein the windshield has the shape of a half shell.

9. The system of product gas collecting conduits according to claim 1, wherein the windshield is configured to protect, against wind and draft, a portion of the product gas collecting conduit that is between the first and the last port tube.

10. The system of product gas collecting conduits according to claim 9, wherein the windshield is configured to protect, against wind and draft, a portion of the product gas collecting conduit that is centrally between the first and the last port tube.

11. The system of product gas collecting conduits according to claim 1, wherein the windshield is configured to protect the product gas collecting conduit on the side opposite the port tubes.

12. The system of product gas collecting conduits according to claim 1, wherein the windshield is of multipart design.

13. A steam reformer, equipped with at least one system of product gas collecting conduits according to claim 1.

14. The system of product gas collecting conduits according to claim 1, wherein there is an absence of insulation between the windshield and the product gas collecting conduit.

15. The system of product gas collecting conduits according to claim 1, wherein the windshield is disposed away from the product gas collecting conduit, such that there is a space disposed between the windshield and the product gas collecting conduit.

16. The system of product gas collecting conduits according to claim 1, wherein the windshield does not touch the product gas collecting conduit.

17. The system of product gas collecting conduits according to claim 1, wherein the primary heat transfer between the windshield and the product gas collecting conduit occurs via convection as opposed to conduction.

18. A system of product gas collecting conduits for a steam reformer, containing a plurality of reaction tubes within a reformer housing, for the production of synthesis gas, the system comprising:
   a) a product gas collecting conduit arranged outside the reformer housing of the steam reformer and exposed to the ambient air, the product gas collecting conduit containing a jacket tube and an inner tube extending concentrically along an entire length of the product gas collecting conduit, wherein the space between inner tube and jacket tube is filled with insulating material;
   b) several, at least one first and one last, port tubes arranged along the length of the product gas collecting conduit for connecting one reaction tube each to the product gas collecting conduit; and
   c) a windshield that is configured to reduce convection heat transfer from the product gas collecting conduit that is attributable to wind and draft at least on a part of the length and the circumference of the product gas collecting conduit.

\* \* \* \* \*